US008150230B2

(12) United States Patent
Tilliette et al.

(10) Patent No.: US 8,150,230 B2

(45) Date of Patent: Apr. 3, 2012

(54) HIGH-VOLTAGE BUSHING

(75) Inventors: Vincent Tilliette, Zurich (CH); Jens Rocks, Freienbach (CH); Stefan Gisy, Dogern (DE); Roger Hedlund, Ludvika (SE); Gerd Chalikia, Ludvika (SE); Ruedi Meili, Hedingen (CH)

(73) Assignee: ABB Research Ltd, Zurich (CH)

( * ) Notice: Subject to any disclaimer, the term of this patent is extended or adjusted under 35 U.S.C. 154(b) by 894 days.

(21) Appl. No.: 12/138,615

(22) Filed: Jun. 13, 2008

(65) Prior Publication Data

US 2009/0014211 A1 Jan. 15, 2009

Related U.S. Application Data

(63) Continuation of application No. PCT/CH2006/000559, filed on Oct. 10, 2006.

(30) Foreign Application Priority Data

Dec. 14, 2005 (EP) .................................... 05027276

(51) Int. Cl.
*H02G 3/18* (2006.01)

(52) U.S. Cl. ..................... 385/138; 174/152 R; 174/650

(58) Field of Classification Search .................. 385/138; 174/152 R, 650–669
See application file for complete search history.

(56) References Cited

U.S. PATENT DOCUMENTS 3,967,051 A * 6/1976 Moore et al. .................. 174/143
7,742,676 B2 * 6/2010 Tilliette et al. ................ 385/138

FOREIGN PATENT DOCUMENTS

DE 19 26 097 1/1970
EP 1 622 173 A1 2/2006
GB 690 022 4/1953
GB 690 022 A 4/1953
GB 1 339 259 A 11/1973

OTHER PUBLICATIONS

International Search Report, Dec. 14, 2006.
European Search Report, May 19, 2006.
Written Opinion, Dec. 14, 2006.
Written Opinion (PCT/ISA/237), Jun. 26, 2008.

* cited by examiner

*Primary Examiner* — Daniel Petkovsek
(74) *Attorney, Agent, or Firm* — Buchanan Ingersoll & Rooney PC

(57) ABSTRACT

A high-voltage bushing has a conductor and a core surrounding the conductor, wherein the core comprises a sheet-like spacer, which spacer is impregnated with an electrically insulating matrix material. The spacer is wound in spiral form around an axis, the axis being defined through the shape of the conductor. Thus, a multitude of neighboring layers is formed. The core further comprises equalization elements in appropriate radial distances to the axis. The equalization elements comprise electrically conductive layers, which layers have openings, through which openings the matrix material can penetrate, and in that the equalization elements are applied to the core separately from the spacer. The electrically conductive layers can be net-shaped, grid-shaped, meshed or perforated. The openings are fillable with the matrix material, e.g., a particle-filled resin can be used.

24 Claims, 2 Drawing Sheets

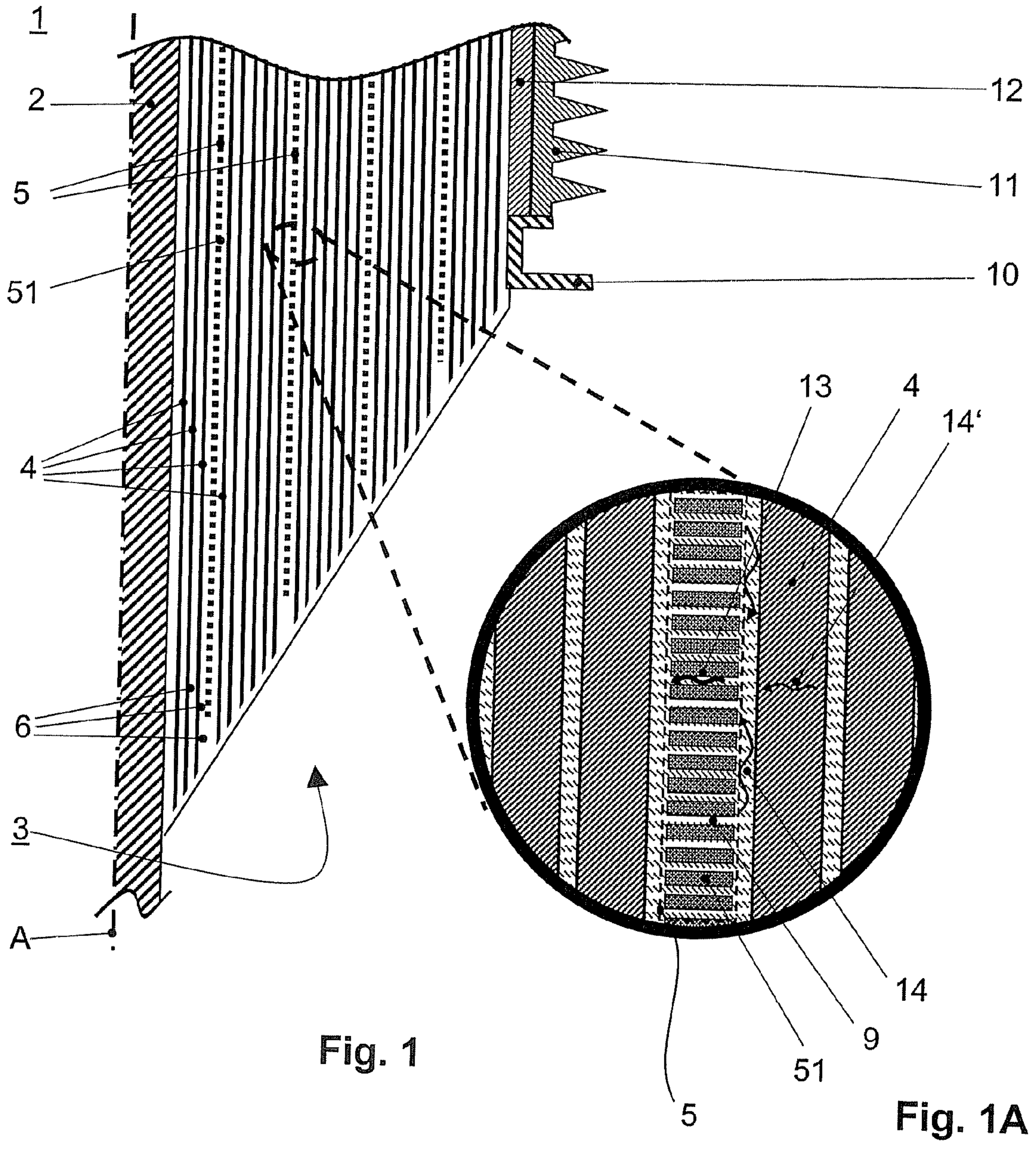
Fig. 1
Fig. 1A
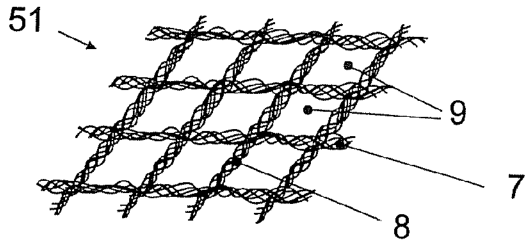
Fig. 2
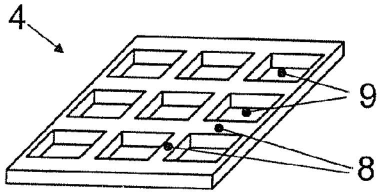
Fig. 3

HIGH-VOLTAGE BUSHING

RELATED APPLICATIONS

This application claims priority under 35 U.S.C. §119 to EP Application 05027276.4 filed in Europe on Dec. 14, 2005, and as a continuation application under 35 U.S.C. §120 to PCT/CH2006/000559 filed as an International Application on Oct. 10, 2006 designating the U.S., the entire contents of which are hereby incorporated by reference in their entireties.

TECHNICAL FIELD

The disclosure relates to the field of high-voltage technology. It relates to a bushing and a method for the production of a bushing and an electrically conductive layer for a bushing. Such bushings find application, e.g., in high-voltage apparatuses like generators or transformers, or in high voltage installations like gas-insulated switchgears or as test bushings.

BACKGROUND INFORMATION

Bushings are devices that are usually used to carry current at high potential through a grounded barrier, e.g., a transformer tank. In order to decrease and control the electric field near the bushing, condenser bushings have been developed, also known as (fine-) graded bushings. Condenser bushings facilitate electrical stress control through insertion of floating equalizer (electrode) plates, which are incorporated in the core of the bushing. The condenser core decreases the field gradient and distributes the field along the length of the insulator, which provides for low partial discharge readings well above nominal voltage readings.

The condenser core of a bushing is typically wound from kraft paper or creped kraft paper as a spacer. The equalization plates are constructed of either metallic (typically aluminium) inserts or non-metallic (ink, graphite paste) patches. These plates are located coaxially so as to achieve an optimal balance between external flashover and internal puncture strength. The paper spacer ensures a defined position of the electrodes plates and provides for mechanical stability.

The condenser cores of today's bushings are impregnated either with oil (OIP, oil impregnated paper) or with resin (RIP, resin impregnated paper). RIP bushings have the advantage that they are dry (oil free) bushings. The core of an RIP bushing is wound from paper, with the electrode plates being inserted in appropriate places between neighbouring paper windings. The resin is then introduced during a heating and vacuum process of the core.

A disadvantage of impregnated paper bushings is that the process of impregnating the pre-wound stack of paper and metal films with oil or with a resin is a slow process. It would be desirable to be able to accelerate the production of high voltage bushings, which bushings nevertheless should be void-free and safe in operation.

The document DE 19 26 097 discloses a high-voltage bushing having a conductor and a core surrounding the conductor, wherein the core comprises spacers, which spacers are impregnated with an electrically insulating matrix material. The spacers have a multitude of holes that are fillable with the matrix material. Each spacer is formed from a mesh of electrically insulating glass fibers in form of a cylindrical tube. For each glass fiber tube, glass fibers are formed around a cylinder and they are impregnated with an epoxy glue and afterwards hardened. Then the hardened spacer tubes are (partially or fully) coated with a conductive (metallic or semiconducting) material, which constitute the equalization plates. The bushing comprises these spacers in form of tubes, which are arranged concentrically around the core. For the impregnation process, the spacer tubes have to be fixed in a mould in order to ensure their correct position and in order to avoid that neighbouring tubes touch each other. Then a particle-filled resin, which is used as a matrix material, is filled into the mould. As several glass fiber tubes of different diameter have to be produced for the production of each bushing and as these tubes have to be put into each other with their position fixed, this method for production is rather time consuming. Besides, for each type of bushing a specific mould has to be made.

GB 690 022 describes an insulator made of spirally wound paper. Paper layers with lines of conductive or semi-conductive material, which are spaced apart from one another, are wound together with unlined paper in order to achieve a spirally wound bushing, which is then impregnated with an insulating liquid, such as oil.

SUMMARY

Exemplary embodiments disclosed herein can create a high voltage bushing and a method for the production of such a bushing that do not have the disadvantages mentioned above. The production process can be accelerated, e.g., is the impregnation process can be shortened.

A bushing with a conductor and a core surrounding the conductor is disclosed, the core comprising a sheet-like spacer, which spacer is impregnated with an electrically insulating matrix material and which spacer is wound in spiral form around an axis, thus forming a multitude of neighbouring layers, the axis being defined through the shape of the conductor, the core further comprising equalization elements in appropriate radial distances to the axis, wherein the equalization elements comprise electrically conductive or semiconductive layers, which layers have openings, through which openings the matrix material can penetrate, and the equalization elements are applied to the core separately from the spacer.

Method is disclosed for the production of said bushing, wherein a sheet-like spacer is wound in spiral form around a conductor or around a mandrel, the shape of the conductor or the mandrel defining an axis, the wound sheet-like spacer thus forming a multitude of neighbouring layers, and then the sheet-like spacer is impregnated with an electrically insulating matrix material, wherein equalization elements comprising electrically conductive layers with openings are applied to the core separately from the spacer in appropriate radial distances to the axis.

In another aspect, a method is disclosed for the production of a bushing with a conductor and a core surrounding the conductor. The method comprises winding a sheet-like spacer in spiral form around a conductor or around a mandrel, the shape of the conductor or the mandrel defining an axis, the wound sheet-like spacer thus forming a multitude of neighbouring layers; impregnating the sheet-like spacer with an electrically insulating matrix material; and applying equalization elements comprising electrically conductive layers with openings to the core separately from the spacer in appropriate radial distances to the axis.

BRIEF DESCRIPTION OF DRAWINGS

Below, the disclosure is illustrated in more detail by means of possible embodiments, which are shown in the included drawings. The figures show schematically:

FIG. 1 cross-section of an exemplary embodiment of a fine-graded bushing, partial view;

FIG. 1A enlarged detail of FIG. 1;

FIG. 2 partial view of an equalization element in form of a net of fibers;

FIG. 3 partial view of an equalization element;

The reference symbols used in the figures and their meaning are summarized in the list of reference symbols. Generally, alike or alike-functioning parts are given the same reference symbols. The described embodiments are meant as examples and shall not confine the disclosure.

DETAILED DESCRIPTION

Figures 4, 4A:
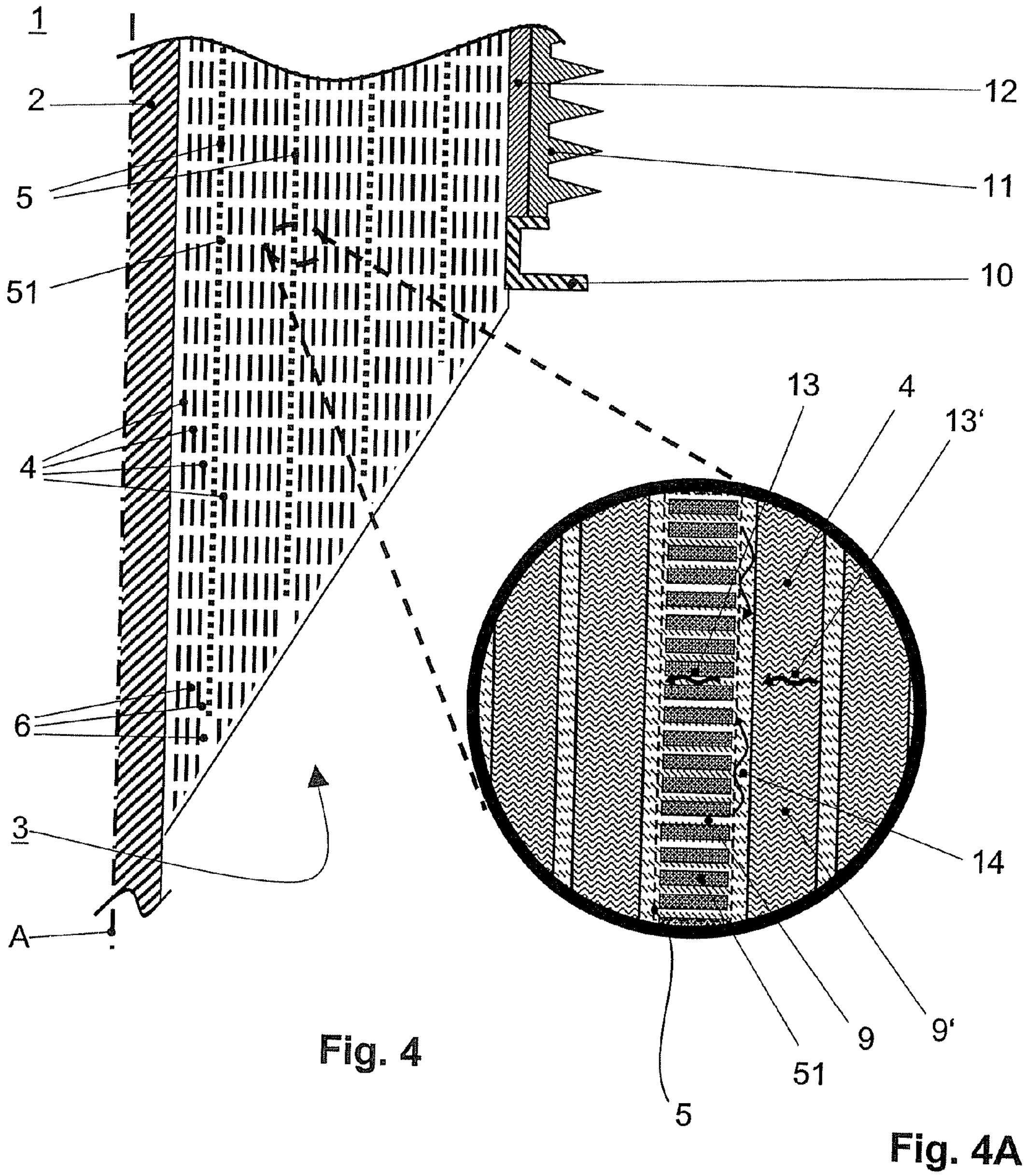
FIG. 4 cross-section of another exemplary embodiment of a fine-graded bushing, partial view.
FIG. 4A enlarged detail of FIG. 4.

According to the disclosure, the bushing has a conductor and a core surrounding the conductor, wherein the core comprises a sheet-like spacer, which spacer is impregnated with an electrically insulating matrix material. The spacer is wound in spiral form around an axis, the axis being defined through the shape of the conductor. Thus a multitude of neighbouring layers is formed. The core further comprises equalization elements, which are arranged in appropriate radial distances to the axis. It is characterized in that the equalization elements comprise electrically conductive layers, which layers have openings, through which openings the matrix material can penetrate and the equalization elements are applied to the core separately from the spacer.

The conductor typically is a rod or a tube or a wire. The core provides for electrical insulation of the conductor and comprises equalization elements. Typically, the core is substantially rotationally symmetric and concentric with the conductor. The flat spacer can be impregnated with a polymer (resin) or with oil or with some other matrix material. The flat spacer can be paper or, e.g., a different material, which is typically wound, in spiral form, thus forming a multitude of neighbouring layers.

The equalization elements are inserted into the core after certain numbers of windings, so that the equalization elements are arranged in a well-defined, prescribable radial distance to the axis. The equalization elements are interspersed with openings, which facilitate and accelerate the penetration of the wound core with the matrix material.

With solid metal films, as in the state of the art, the matrix material has to creep through the stack of pre-wound paper and metal films from the sides, i.e. it has to creep between the layers from the two sides parallel to the axis A, because the matrix material cannot penetrate through the metal films. If the equalization elements comprise layers with a multitude of openings, the exchange of matrix material in direction perpendicular to the axis is made possible. If the openings are large enough and the winding is done accordingly, channels will be formed within the core, which will quickly guide the matrix material through the core during impregnation in the directions perpendicular to the axis A.

The use of separate equalization elements with a multitude of openings so allows the use of alternative materials. Independently from the spacer material, the material of the equalization elements can be chosen. Furthermore the size, shape and/or distribution of the openings in the equalization elements can be optimized independently from the spacer material.

In an exemplary embodiment the equalization elements are wound between two spacer layers, i.e. the sheet-like spacer is wound and during the winding process an equalization element is inserted. The winding process is continued so that the equalization element in the fabricated bushing lies between two layers of wound spacer. This method is very easy and allows a control of the thickness of the already pre-wound stack, so that the radial position of the equalization element can be defined very accurately.

In an exemplary embodiment the electrically conductive layers, which form the equalization elements, are net-shaped, grid-shaped, meshed or perforated. The design of the net-shaped, grid-shaped, meshed or perforated layers and, consequently the size and/or distribution of the openings in these layers can be arranged regularly or irregularly. Also the shape of the openings may be constant or may vary throughout the layer or from one layer to the other. With these variations a variation of the opening-area density, defined as the ratio of the area of openings to the total area of the electrically conductive layer in a given region of the electrically conductive layer can be achieved. In an exemplary embodiment the opening-area density varies in a direction perpendicular to the winding direction and parallel to the axis in such a way that the opening-area density increases towards the central part. In a conventional bushing it takes longer until the central part of the bushing is impregnated with the matrix material than the outer parts. With such a variation of the opening-area density the impregnation process is enhanced in the central part.

In another exemplary embodiment of the present disclosure the electrically conductive layers comprise a multitude of fibers, which are coated with an electrically conductive coating. For example, the electrically conductive layers can substantially consist of fibers. Various materials can be used in the electrically conductive layers in form of fibers. e.g. organic fibers, like polyethylene and polyester, or inorganic fibers, like alumina or glass, or other fibers, like fibers from silicone. Fibers of different materials can also be used in combination in the electrically conductive layers. Single fibers or bundles of fibers can be used as warp and woof of a fabric. Fibers that have a low or vanishing water uptake can be used, e.g., a water uptake that is small compared to the water uptake of cellulose fibers, which are used in the bushings known from the state of the art.

As non-electrically conductive fibers to be used with an electrically conductive coating there are organic or inorganic fibers available. Suitable organic fibers are polyethylene (PE), polyester, polyamide, aramid, polybenzimidazole (PBI), polybenzobisoxazole (PBO), polyphenylene sulphide (PPS), melamine, phenolic and polyimide. Typical inorganic fibers are glass, quartz, basalt and alumina. As electrically conductive fibers carbon, boron, silicon carbide, metal coated carbon and aramide are suitable.

In another exemplary embodiment of the present disclosure the electrically conductive layers are made of solid conductive or semiconducting material. The layers can be net-shaped, grid-shaped, meshed or perforated. Alternatively, the layers can be made of foils of solid electrically conducting or semiconducting material, which foils have openings in the form of holes through the foils. Alternatively, also polymer foils with a conductive or semiconductive coating, which comprise openings in the form of holes, can be used. Polymer foils with conductive or semiconductive coatings can be advantageous for the stability of the foil during the production process. The shape, size and/or distribution of the holes may be constant or may vary throughout the layer. With these variations a variation of the opening-area density, defined as the ratio of the area of openings to the total area of the electrically conductive layer in a given region of the electrically conductive layer can be achieved. In an exemplary embodiment the opening-area density varies in a direction perpendicular to the winding direction and parallel to the axis in such a way that the opening-area density increases towards the central part.

In another exemplary embodiment of the present disclosure the electrically conductive layers are coated and/or surface treated for an improved adhesion between the electrically conductive layers and the matrix material. Depending on the material of the electrically conductive layers, it can be advantageous to brush, etch, coat or otherwise treat the surface of the electrically conductive layers, in order to achieve an improved interaction between the electrically conductive layers and the matrix material. This will provide for an enhanced thermo-mechanical stability of the core.

Typically unpierced paper is used as spacer material together with unfilled, low-viscosity polymers as matrix material. In another exemplary embodiment, instead of using unpierced paper, the spacer has a multitude of openings. A bushing with such a spacer having a multitude of openings is described in the European patent application EP 04405480.7 (not published yet). The contents of this patent application is expressly incorporated in the contents of this patent application. The spacer can be net-shaped, grid-shaped, meshed or perforated, as it has already been disclosed above for the equalization elements. The spacer can comprise a multitude of fibers, like polymers or organic or inorganic fibers. The combination of spacer and equalization elements, both with openings, permits a very fast penetration of the matrix material through the stack of spacer layers and equalization elements. The penetration takes place mainly in direction perpendicular to the axis.

The combination of spacer and equalization elements, both with openings allows a large variety of matrix materials. For example, particle-filled polymers can be used as matrix materials, what results in several thermo-mechanical advantages and in an improved (accelerated) bushing produceability. This can result in a considerable reduction of the time needed for curing the matrix material.

In an exemplary embodiment the matrix material comprises filler particles. For example, it comprises a polymer with filler particles. The polymer can for example be an epoxy resin, a polyester resin, a polyurethane resin, or another electrically insulating polymer. The filler particles can be electrically insulating or semiconducting. The filler particles can, e.g., be particles of $SiO_2$, $Al_2O_3$, BN, Aln, BeO, $TiB_2$, $TiO_2$, SiC, $Si_3N_4$, $B_4C$ or the like, or mixtures thereof. It is also possible to have a mixture of various such particles in the polymer. The physical state of the particles can be solid.

Compared to a core with un-filled epoxy as matrix material, there will be less epoxy in the core, if a matrix material with a filler is used. Accordingly, the time needed to cure the epoxy can be considerably reduced, which reduces the time needed to manufacture the bushing.

It is advantageous if the thermal conductivity of the filler particles is higher than the thermal conductivity of the polymer. A higher thermal conductivity of the core through use of a matrix material with a filler will allow for an increased current rating of the bushing or for a reduced weight and size of the bushing at the same current rating. Also the heat distribution within the bushing under operating conditions is more uniform when filler particles of high thermal conductivity are used.

And it is also advantageous if the coefficient of thermal expansion (CTE) of the filler particles is smaller than the CTE of the polymer. If the filler material is chosen accordingly, the thermo-mechanical properties of the bushing are considerably enhanced. A lower CTE of the core due to the use of a matrix material with a filler will lead to a reduced total chemical shrinkage during curing. This enables the production of (near) end-shape bushings (machining free), and therefore considerably reduces the production time. In addition, the CTE mismatch between core and conductor (or mandrel) can be reduced.

Furthermore, due to a filler in the matrix material, the water uptake of the core can be largely reduced, and an increased fracture toughness (higher crack resistance) can be achieved (higher crack resistance). Using a filler can significantly reduce the brittleness of the core (higher fracture toughness), thus enabling to enhance the thermo-mechanical properties (higher glass transition temperature) of the core.

Such a bushing is a graded or a fine-graded bushing. Typically, one single layer of the spacer material is wound around the conductor or around a mandrel so as to form a spiral of spacer material. For example in the case of very long bushings, two or more axially shifted strips of spacer material may be wound in parallel. It is also possible to wind a spiral of double-layer or even thicker spacer material; such a double- or triple-layer could then nevertheless be considered as the one layer of spacer material, which spacer material in that case would happen to be double- or triple-layered.

FIG. 1 schematically shows a partial view of a cross-section of a fine-graded bushing 1. The bushing is substantially rotationally symmetric with a symmetry axis A. In the center of the bushing 1 is a solid metallic conductor 2, which also could be a tube or a wire. The conductor 2 is partially surrounded by a core 3, which also is substantially rotationally symmetric with the symmetry axis A. The core 3 comprises a spacer 4, which is wound around the core 3 and impregnated with a curable epoxy as a matrix material 6. In prescribable distances from the axis A electrically conductive layers 51 are inserted between neighbouring windings of the spacer 4, so as to function as equalization elements 5. On the outside of the core 3, a flange 10 is provided, which allows to fix the bushing 1 to a grounded housing of a transformer or a switchgear or the like. Under operation conditions the conductor 2 will be on high potential, and the core 3 provides for the electrical insulation between the conductor 2 and the flange 10 on ground potential. On that side of the bushing 2, which usually is located outside of the housing, an insulating envelope 11 surrounds the core 3. The envelope 11 can be a hollow composite made of, e.g., porcelain, silicone or an epoxy. The envelope 11 may be provided with sheds or, as shown in FIG. 1, comprise sheds. The envelope 11 shall protect the core 3 from ageing (UV radiation, weather) and maintain good electrical insulating properties during the entire life of the bushing 1. The shape of the sheds is designed such, that it has a self-cleaning surface when it is exposed to rain. This avoids dust or pollution accumulation on the surface of the sheds, which could affect the insulating so properties and lead to electrical flashover.

In case that there is an intermediate space between the core 3 and the envelope 11, an insulating medium 12, e.g. an insulating liquid 12 like silicone gel or polyurethane gel, can be provided to fill that intermediate space.

The enlarged partial view FIG. 1A of FIG. 1 shows the structure of the core 3 in greater detail. An equalization element 5 is enclosed by two layers of spacer 4. The equalization elements 5 are inserted in certain distances from the axis A between neighbouring spacer windings. Usually there are several layers of spacer 4 between two neighbouring equalization elements 5, in FIG. 1 there are six layers of spacer 4 between neighbouring equalization elements 5. Through the number of spacer windings between neighbouring equalization elements 5 the (radial) distance between neighbouring equalization elements 5 can be chosen. The radial distance between neighbouring equalization elements 5 may be varied from one equalization element to the next. The equalization element 5 in FIG. 1A is formed as an electrically conductive layer 51 with a multitude of openings 9, which are fillable with matrix material 6. For example, in FIG. 1A the electrically conductive layer 51 is made of a solid foil with openings 9 in the form of holes.

In an exemplary embodiment of the present disclosure the openings 9 in the equalization plates have a lateral extension in the range of 50 nm to 5 cm, in particular 1 μm to 1 cm. The thickness of the equalization plates 4 can be in the range of 1 μm to 2 mm and the width of the bridges 8 typically is in the range of 1 mm to 10 cm, in particular 5 mm to 5 cm. The area consumed by the openings 9 can be larger than the area consumed by the bridges 8. Typically, in the plane of the equalization plates, the area consumed by the openings 9 is between 1% and 90% of the total area of the electrically conductive layer 51 in a given region of the electrically conductive layer, in particular 5% to 75% of the total area of the electrically conductive layer.

FIG. 2 schematically shows a top view on an electrically conductive layer 51. Bundles 7 of fibers form bridges or cross-pieces 8, through which openings 9 are defined. In a cross-section through such a net, when wound to a spiral, fiber bundles and openings 9 between these are visible, as shown in FIG. 1A. The fibers are interlinked in a net-shaped, grid-shaped, meshed or perforated manner, more generally in a manner, in which a fabric is manufactured with a texture, in which openings 9 are created by the arrangement of the bundles of fibers 7. Instead of bundles 7 of fibers, the net-shaped, grid-shaped, meshed or perforated electrically conductive layers 5 can also be formed from single fibers (not shown).

In general, the equalization elements 5 comprise layers 51 with openings 9. These layers 51 do not necessarily have to be evenly designed in any direction. Also, the size, shape and/or distribution of the openings 9 do not necessarily have to be evenly spaced in any direction. With these variations a variation of the opening-area density, defined as the ratio of the area of openings 9 to the total area of the electrically conductive layer 51 in a given region of the electrically conductive layer can be achieved. It can be advantageous to vary the size, shape and/or distribution of the openings 9 along the axial direction and/or perpendicular to the axial direction, such that a void-free impregnation of the core 3 is facilitated. It can be advantageous, e.g. to lower the openings-area density at the margins of the equalization elements 5 perpendicular to the winding direction and parallel to the axis A in order to achieve a homogeneous distribution of the matrix material 6, because at these margins of the equalization elements 5 the matrix material 6 can penetrate from the directions perpendicular to the axis A as well as from the direction parallel to the axis A, therefore the impregnation is quicker in these areas.

In a core 3 wound with equalization elements 5 without openings, as they are known from the state of the art, the matrix material 6 cannot pass through the equalization elements 5 and, therefore, matrix material has to impregnate the core from the sides, i.e. it has to creep between the layers 4 and/or 51 from the two sides parallel to the axis A and in radial direction around the axis A between two layers. That is shown in FIG. 1A by thin arrows 14. Depending on the spacer material, the spacer 4 may also be at least partially pervious for the matrix material 6, depicted in FIG. 1A by thin arrows 14'. With the exemplary equalization elements 5 with openings 9, the matrix material 6 can flow through the openings 9 in the equalization elements 5 during impregnation through channels 13, depicted in FIG. 1A by thick arrows.

FIG. 4 schematically shows a partial view of a cross-section of a fine-graded bushing 1 according to a further exemplary embodiment of the bushing. The enlarged partial view FIG. 4A of FIG. 4 shows the structure of the core 3 in greater detail. As shown in FIG. 4A, the impregnation process can be enhanced, if the equalization elements 5 and the spacer 4 comprise a multitude of openings 9, 9' forming channels 13 and 13', through which channels the matrix material 6 can pass. In that case, the matrix material 6 can quickly penetrate the spacer 4 as well as the equalization elements 5 from the directions perpendicular to the axis A into direction of the conductor 2 or mandrel, respectively, depicted by thick arrows 13, 13'. In an exemplary embodiment, openings 9 of neighbouring spacer windings overlap, so that channels 13, 13' are formed within neighbouring spacer layers, into which and through which the matrix material 6 can flow during impregnation. In another exemplary embodiment, openings 9, 9' of all neighbouring layers, i.e. of spacer 4 and of electrically conductive layers 51, overlap, so that channels 13, 13' are formed through the core 3 to the conductor 2, or mandrel respectively. The spacer 4 as shown in FIG. 4A is net-shaped, but it as also possible that the spacer 4 is grid-shaped, meshed or perforated.

Typically, there are between two and fifteen spacer windings (layers) between neighbouring equalization elements 5, but it is also possible to have only one spacer layer between neighbouring equalization elements 5 or to have more than fifteen spacer layers.

The equalization element 5 can also be made from a solid piece of material, instead of from fibers. FIG. 3 shows an example. A solid electrically conductive foil or a foil of semiconducting material comprises openings 9 in the form of holes, which are separated from each other by bridges 8. Instead of using a solid foil, it is also possible to use a polymer foil with a surface metallization or with a coating with semiconducting material. The shape of the holes can be square, as shown in FIG. 3, but any shape is possible, e.g., rectangular or round or oval. As solid, electrical conductive material a lot of metals are available like silver, copper, gold, aluminium, tungsten, iron, steel, platinum, chromium, lead, nickel/chrome, constantan, tin or metallic alloys. Alternatively, the electrically conductive layer 51 can also be made of carbon.

The matrix material 6 in the core 3 in FIG. 4 can be a particle-filled polymer. For example an epoxy resin or polyurethane filled with particles of $Al_2O_3$. Typical filler particle sizes are in the range of 10 nm to 300 nm. The spacer 4 and the equalization elements 5 have to be shaped, i.e. have to comprise openings 9, 9' of such a size that the filler particles can distribute throughout the core 3 during impregnation. In conventional bushings with (hole-free) paper as spacer, the paper would function as a filter for such particles. It can easily be provided for channels 13, which are large enough for a flowing through of a particle-filled matrix material 6, as shown in FIG. 4A.

The thermal conductivity of a standard RIP-core with pure (not particle-filled) resin is typically about 0.15 W/mK to 0.25 W/mK. When a particle-filled resin is used, values of at least 0.6 W/mK to 0.9 W/mK or even above 1.2 W/mK or 1.3 W/mK for the thermal conductivity of the bushing core can readily be achieved.

In addition, the coefficient of thermal expansion (CTE) can be much smaller when a particle-filled matrix material 6 is used instead of a matrix material without filler particles. This results in less thermo-mechanical stress in the bushing core.

The production process of a bushing 1 as described in conjunction with FIG. 1 or FIG. 4 typically comprises the steps of winding the spacer 4 (in one or more strips or pieces)

onto the conductor 2, applying the equalization elements 5 during winding, applying a vacuum and applying the matrix material 6 to the evacuated core 3 until the core 3 is fully impregnated. The impregnation under vacuum takes place at temperatures of typically between 25° C. and 130° C. Then the epoxy matrix material 6 is cured (hardened) at a temperature of typically between 60° C. and 150° C. and eventually post-cured in order to reach the desired thermo-mechanical properties. Then the core 3 is cooled down, eventually machined, and the flange 10, the insulating envelope 11 and other parts are applied. Instead of winding the spacer 4 on the conductor 2, it is also possible to wind the spacer 4 on a mandrel, which is removed after finishing the production process. Later a conductor 2 may be inserted into the hole in the core 3 which is left at the place at which the mandrel was positioned. In that case, the conductor 2 may be surrounded by some insulating material like an insulating liquid in order to avoid air gaps between the conductor 2 and the core 3.

The equalization elements 5 can be applied to the core 3 by winding them between two spacer layers, i.e. the sheet-like spacer 4 is wound and during the winding process an equalization element 5 is inserted. The winding process is continued so that the equalization element 5 in the fabricated bushing lies between two layers of wound spacer 4. This method is very easy and allows a control of the thickness of the already pre-wound stack, so that the radial position of the equalization element can be defined very accurately.

Another possibility is to fix the equalization element 5 to the spacer 4 before or during winding. That can e.g. be done by gluing the equalization element 5 on the spacer or by fixing them together by a heating process, in which spacer 4 and equalization element 5 are laid above each other and heat is applied, by which at least one of the materials, i.e. the material of the spacer 4 and/or the equalization element 5 at least partially melts or weakens and thereby forms a connection with the other material. At least one of the materials, i.e. the spacer 4 and/or the equalization element 5 could also have a coating, which has a low melting point and which facilitates this process. Another possibility to fix the equalization element 5 on the spacer 4 is to coat the spacer 4 together with the equalization element 5 with a fixing coating. Alternatively, it is possible to fix the equalization element 5 mechanically, e.g. by using a sort of clamp or by a fiber that connects the spacer 4 with the equalization element 5. It is even possible to use an equalization element 5 and a spacer 4 with such a surface structure that they can be interlinked as a hook and loop fastener connection. Instead of using one electrically conductive layer 51 as an equalization element 5, it is possible to use at least two electrically conductive layers 51 as one equalization element 5.

Typical voltage ratings for high voltage bushings are between about 50 kV to 800 kV, at rated currents of 1 kA to 50 kA.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

LIST OF REFERENCE SYMBOLS

1 bushing, condenser bushing
2 conductor
3 core
4 sheet-like spacer
5 equalization element
51 layer
6 matrix material
7 bundle of fibers
8 cross-piece, bar, bridge
9 opening
10 flange
11 insulating envelope (with sheds), hollow core composite
12 insulating medium, gel
13 channel
A axis

What is claimed is:

1. A bushing comprising: wound around an axis such that a multitude of neighboring layers is formed
- a conductor; and
- a core surrounding the conductor, wherein the core includes a spacer that is wound around an axis such that a multitude of neighbouring layers is formed,
- wherein the axis is defined through a rotationally symmetric shape of the conductor,
- wherein the spacer is impregnated with an electrically insulating matrix material,
- wherein the core includes equalization elements at radial distances from the axis, and
- wherein the equalization elements include electrically conductive or semi-conductive layers having openings through which the matrix material can penetrate.

2. The bushing according to claim 1, wherein the equalization elements are wound separately from the spacer.

3. The bushing according to claim 2, wherein the electrically conductive layers include metal, a semiconducting material or carbon.

4. The bushing according to claim 2, wherein the electrically conductive layers include a multitude of fibers.

5. The bushing according to claim 2, wherein the electrically conductive layers are made of metal, metal alloy or carbon, with openings in the form of holes.

6. The bushing according to claim 2, wherein at least one of a size and a number of the openings in the electrically conductive layers varies along a direction parallel to the axis.

7. The bushing according to claim 2, wherein the spacer includes an electrically insulating layer having openings through which the matrix material can penetrate.

8. The bushing according to claim 2, wherein the electrically conductive layer has a multitude of openings and forms an individual equalization element.

9. The bushing according to claim 1, wherein
- the electrically conductive layers include at least one of metal, a semiconducting material and carbon.

10. The bushing according to claim 1, wherein the electrically conductive layers include a multitude of fibers.

11. The bushing according to claim 10, wherein the electrically conductive layers are net-shaped, grid-shaped, meshed or perforated.

12. The bushing according to claim 1, wherein the electrically conductive layers are net-shaped, grid-shaped, meshed or perforated.

13. The bushing according to claim 1, wherein the electrically conductive layers are made of solid foils with openings formed as holes.

14. The bushing according to claim 13, wherein the electrically conductive layers are at least one of coated and surface treated for adhesion between the electrically conductive layers and the matrix material.

15. The bushing according to claim 1, wherein the electrically conductive layers are at least one of coated and surface treated for adhesion between the electrically conductive layers and the matrix material.

16. The bushing according to claim 1, wherein at least one of a size and a number of openings in the electrically conductive layers varies along a direction parallel to the axis.

17. The bushing according to claim 1, wherein the spacer is flat and includes an electrically insulating layer having openings through which the matrix material can penetrate.

18. The bushing according to claim 17, wherein the matrix material includes filler particles.

19. The bushing according to claim 18, wherein the filler particles are electrically insulating or semiconducting.

20. The bushing according to claim 19, wherein at least one of a thermal conductivity of the filler particles is higher than a thermal conductivity of the polymer and a coefficient of thermal expansion of the filler particles is smaller than a coefficient of thermal expansion of the polymer.

21. The bushing according to claim 8, wherein at least one of a thermal conductivity of the filler particles is higher than a thermal conductivity of the polymer and a coefficient of thermal expansion of the filler particles is smaller than a coefficient of thermal expansion of the polymer.

22. The bushing according to claim 1, wherein the electrically conductive layer has a multitude of openings and forms an individual equalization element.

23. A high-voltage apparatus, a generator or a transformer, comprising a bushing according to claim 1.

24. A high-voltage installation or a switchgear, comprising a bushing according to claim 1.

* * * * *